United States Patent
Omuro et al.

(10) Patent No.: US 9,604,530 B2
(45) Date of Patent: Mar. 28, 2017

(54) DRIVE SYSTEM FOR HYBRID VEHICLE

(71) Applicant: TOYOTA JIDOSHA KABUSHIKI KAISHA, Toyota-shi, Aichi-ken (JP)

(72) Inventors: Keisuke Omuro, Toyota (JP); Atsushi Tabata, Okazaki (JP); Ryuji Ibaraki, Miyoshi (JP); Yuji Yasuda, Miyoshi (JP); Isao Sato, Nagoya (JP); Toshiki Kanada, Anjo (JP); Tatsuya Imamura, Okazaki (JP); Kouichi Okuda, Toyota (JP); Masafumi Yamamoto, Toyota (JP); Keita Imai, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/906,318

(22) PCT Filed: Jul. 16, 2014

(86) PCT No.: PCT/IB2014/001329
§ 371 (c)(1),
(2) Date: Jan. 20, 2016

(87) PCT Pub. No.: WO2015/011538
PCT Pub. Date: Jan. 29, 2015

(65) Prior Publication Data
US 2016/0159212 A1 Jun. 9, 2016

(30) Foreign Application Priority Data

Jul. 23, 2013 (JP) .................................. 2013-153019

(51) Int. Cl.
*B60K 6/547* (2007.10)
*B60K 6/365* (2007.10)
(Continued)

(52) U.S. Cl.
CPC .............. *B60K 6/547* (2013.01); *B60K 6/365* (2013.01); *B60K 6/387* (2013.01); *B60K 6/40* (2013.01);
(Continued)

(58) Field of Classification Search
CPC . B60K 6/48; B60K 6/547; B60K 6/40; B60K 6/365; B60K 6/387; B60K 6/445;
(Continued)

(56) References Cited

U.S. PATENT DOCUMENTS

2010/0029429 A1* 2/2010 Ota ........................ B60K 6/445
475/5

FOREIGN PATENT DOCUMENTS

JP  2008-120234 A  5/2008
JP  2008-265598 A  11/2008
(Continued)

*Primary Examiner* — Erin D Bishop
(74) *Attorney, Agent, or Firm* — Oliff PLC (57) ABSTRACT

A drive system for a hybrid vehicle, the drive system includes an engine (1), a rotary machine (MG1), a differential unit (20), and a transmission unit (10). The rotary machine (MG1) is arranged coaxially with the engine (1). The differential unit (20) connects the engine (1) and the rotary machine (MG1) to a drive wheel side. The differential unit (20) is arranged coaxially with the engine (1) and the rotary machine (MG1). The differential unit (20) is arranged between the engine (1) and the rotary machine (MG2). The transmission unit (10) changes rotation of the engine in speed and transmits the rotation to the differential unit (20). The transmission unit (10) is arranged coaxially with the engine (1), the rotary machine (MG1) and the differential unit (20). The rotary machine (MG1) and the differential unit (20) are arranged between the transmission unit (10) and the engine (1).

2 Claims, 7 Drawing Sheets

(51) Int. Cl.
  *B60K 6/387* (2007.10)
  *B60K 6/40* (2007.10)
  *B60K 6/405* (2007.10)
  *B60K 6/445* (2007.10)
  *F16H 3/72* (2006.01)
  *F16H 3/66* (2006.01)
  *F16H 61/02* (2006.01)
  *F16H 61/00* (2006.01)
  *F16H 37/08* (2006.01)

(52) U.S. Cl.
  CPC ............ *B60K 6/405* (2013.01); *B60K 6/445* (2013.01); *F16H 3/666* (2013.01); *F16H 3/728* (2013.01); *F16H 61/0265* (2013.01); *B60Y 2200/92* (2013.01); *B60Y 2400/42* (2013.01); *B60Y 2400/73* (2013.01); *B60Y 2400/80* (2013.01); *F16H 2037/0866* (2013.01); *F16H 2061/0046* (2013.01); *F16H 2200/0034* (2013.01); *Y02T 10/6239* (2013.01); *Y10S 903/915* (2013.01)

(58) Field of Classification Search
  CPC .... B60K 2006/4808; B60K 2006/4816; F16H 3/728; F16H 3/725; F16H 3/72; F16H 3/66; F16H 2200/0034; F16H 2037/0866; F16H 37/065; B60Y 2200/92; B60Y 2400/73; B60Y 2400/80; Y02T 10/6239; Y10S 903/915; Y10S 903/919
  See application file for complete search history.

(56) References Cited

FOREIGN PATENT DOCUMENTS

| | | |
|---|---|---|
| JP | 2008-265600 A | 11/2008 |
| JP | 2009-012693 A | 1/2009 |
| JP | 2009-190694 A | 8/2009 |
| JP | 2012-035757 A | 2/2012 |
| WO | 2013/034538 A1 | 3/2013 |

* cited by examiner

| | | | CL1 | BK1 | MG1 | MG2 |
|---|---|---|---|---|---|---|
| EV | FORWARD/ REVERSE TRAVELING | SINGLE-DRIVE DRIVE | | | G | M |
| | | SINGLE-DRIVE IN COMBINATION WITH ENGINE BRAKE | △ | △ | G | M |
| | | DOUBLE-DRIVE | ○ | ○ | M | M |
| HV | FORWARD TRAVELING | HIGH | | ○ | G | M |
| | | LOW | ○ | | G | M |
| | REVERSE TRAVELING | LOW | ○ | | G | M |

○ : ENGAGED   △ : EITHER ONE IS ENGAGED WHEN ENGINE BRAKE IS USED IN COMBINATION
G : MAINLY GENERATOR   M : MAINLY MOTOR, BUT GENERATOR DURING REGENERATION

DRIVE SYSTEM FOR HYBRID VEHICLE

BACKGROUND OF THE INVENTION

1. Field of the Invention

The invention relates to a drive system for a hybrid vehicle.

2. Description of Related Art

A hybrid vehicle including a transmission mechanism is publicly known. For example, Japanese Patent Application Publication No. 2008-120234 (JP 2008-120234 A) describes a technique of a drive system for a hybrid vehicle including a transmission mechanism that changes the rotation of an internal combustion engine in speed and transmits the rotation to a power distribution mechanism. In this drive system, the internal combustion engine that serves as a power source, a first motor generator, a second motor generator, the transmission mechanism, a power split mechanism, and an output shaft are arranged along the same axis. The drive system is mainly applicable to a front-engine rear-wheel-drive (FR) vehicle. In addition, Japanese Patent Application Publication No. 2012-35757 (JP 2012-35757 A) describes a multi-shaft drive system for a hybrid vehicle, which is applicable to a front-engine front-wheel-drive (FF) vehicle or a rear-engine rear-wheel-drive (RR) vehicle.

SUMMARY OF THE INVENTION

As described in JP 2008-120234 A, if the drive system including the transmission mechanism and having an arrangement configuration that is mainly applied to an FR vehicle is applied to an FF vehicle or an RR vehicle, the arrangement configuration of the existing drive system needs to be changed, so commonality of components is not provided between the existing drive system and the drive system that is applied to an FF vehicle or an RR vehicle, and there is a concern that cost increases.

The invention provides a drive system for a hybrid vehicle, which is able to suppress an increase in cost even when the drive system includes a transmission mechanism.

An aspect of the invention provides a drive system for a hybrid vehicle. The drive system includes an engine, a rotary machine, a differential unit, and a transmission unit. The rotary machine is arranged coaxially with the engine. The differential unit connects the engine and the rotary machine to a drive wheel side. The differential unit is arranged coaxially with the engine and the rotary machine. The differential unit is arranged between the engine and the rotary machine. The transmission unit changes rotation of the engine in speed and transmits the rotation to the differential unit. The transmission unit is arranged coaxially with the engine, the rotary machine and the differential unit. The rotary machine and the differential unit are arranged between the transmission unit and the engine.

In the drive system according to the aspect of the invention, the transmission unit may include a planetary gear unit which is configured to transmit rotation of the engine to the differential unit and a shift device which is configured to shift, a speed ratio of the planetary gear unit. The planetary gear unit may be of a double pinion type. The shift device may be arranged between the planetary gear unit and the rotary machine.

The drive system according to the aspect of the invention may further include an oil supply passage arranged inside a support wall that supports the rotary machine. The support wall may extend between the rotary machine and the shift device. The shift device may include a hydraulic engagement element. The shift device may be configured to shift the speed ratio by engaging or releasing the engagement element. The oil supply passage may be configured to supply working oil to the engagement element of the shift device.

With the drive system according to the aspect of the invention, the rotary machine and the differential unit are arranged between the transmission unit and the engine. Therefore, it is possible to provide commonality of components between the drive system and a drive system including no transmission unit, so it is possible to suppress an increase in cost even when the transmission unit is included.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, embodiments of the drive system for a hybrid vehicle according to the invention will be described with reference to the accompanying drawings. In the drawings, like reference numerals denote the same or corresponding portions, and the description thereof is not repeated.

Figure 1:
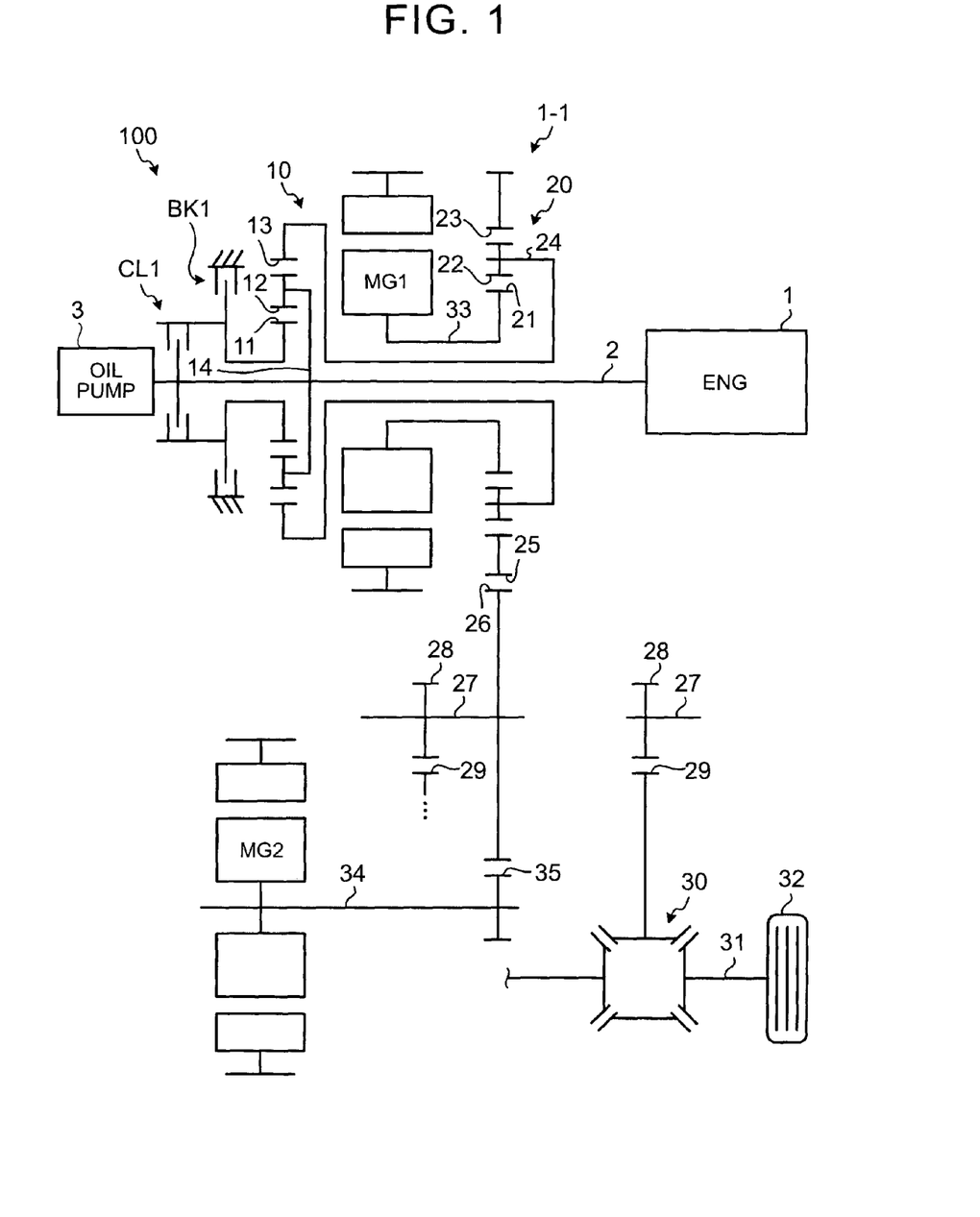
FIG. 1 is a skeletal view of a hybrid vehicle drive system according to a first embodiment of the invention.
Figure 2:
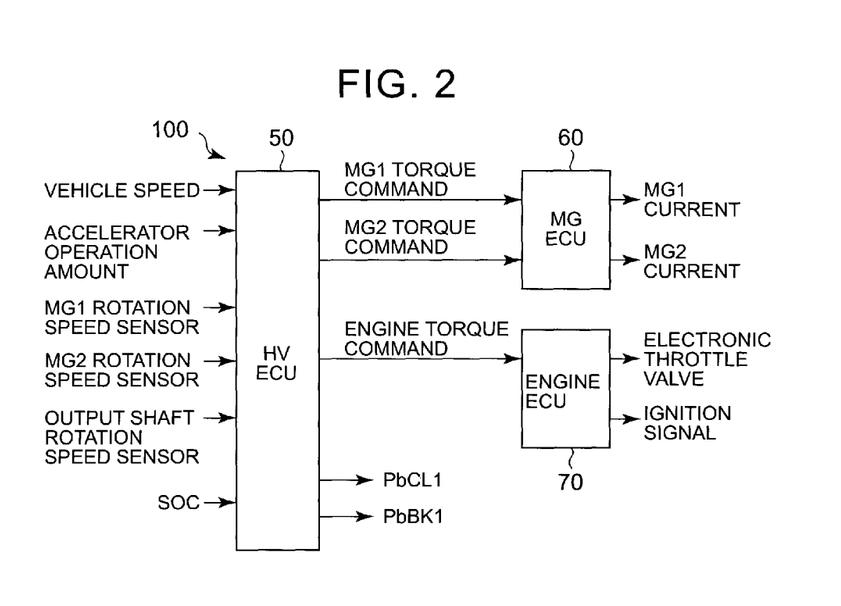
FIG. 2 is an input/output relationship diagram of a vehicle to which the hybrid vehicle drive system according to the first embodiment is applied.

A first embodiment will be described with reference to FIG. 1 to FIG. 8. The configuration of a hybrid vehicle drive system according to the first embodiment of the invention will be described with reference to FIG. 1 and FIG. 2. FIG. 1 is a skeletal view of the hybrid vehicle drive system according to the first embodiment of the invention. FIG. 2 is an input/output relationship diagram of a vehicle to which the hybrid vehicle drive system according to the present embodiment is applied.

The vehicle 100 according to the present embodiment is a hybrid vehicle including an engine 1, a first rotary machine MG1 and a second rotary machine MG2 as power sources. The vehicle 100 may be a plug-in hybrid vehicle that is rechargeable by an external power supply. As shown in FIG. 1 and FIG. 2, the vehicle 100 is configured to include the engine 1, a first planetary gear mechanism 10, a second planetary gear mechanism 20, the first rotary machine MG1, the second rotary machine MG2, a clutch CL1, a brake BK1, an HV_ECU 50, an MG_ECU 60 and an engine_ECU 70.

The hybrid vehicle drive system 1-1 according to the present embodiment is configured to include the engine 1, the first rotary machine MG1, the second rotary machine MG2, the first planetary gear mechanism 10, the second planetary gear mechanism 20, the clutch CL1 and the brake BK1. The hybrid vehicle drive system 1-1 may be configured to further include controllers, such as the ECUs 50, 60, 70. The hybrid vehicle drive system 1-1 is applicable to a front-engine front-wheel-drive (FF) vehicle, a rear-engine rear-wheel-drive (RR) vehicle, or the like. The hybrid vehicle drive system 1-1 is, for example, mounted on the vehicle 100 such that its axial direction is oriented in a vehicle width direction.

In the hybrid vehicle drive system 1-1 according to the present embodiment, a transmission unit is configured so as to include the first planetary gear mechanism 10, the clutch CL1 and the brake BK1 and to change the rotation of the engine 1 in speed and transmit the rotation to the second planetary gear mechanism 20. In addition, a differential unit is configured so as to include the second planetary gear mechanism 20 and to connect the engine 1 and the first rotary machine MG1 to drive wheels side. In addition, a shift device is configured to include the clutch CL1 and the brake BK1 and to shift the speed ratio of the first planetary gear mechanism 10.

The engine 1 that is an engine converts combustion energy of fuel to rotational motion of an output shaft and outputs the rotational motion. The output shaft of the engine 1 is connected to an input shaft 2. The input shaft 2 is an input shaft of a power transmission device. The power transmission device is configured to include the first rotary machine MG1, the second rotary machine MG2, the clutch CL1, the brake BK1, a differential device 30, and the like. The input shaft 2 is arranged coaxially with the output shaft of the engine 1 along the extended line of the output shaft. The input shaft 2 is connected to a first carrier 14 of the first planetary gear mechanism 10.

The first planetary gear mechanism 10 is connected to the engine 1, and corresponds to a power transmission mechanism that transmits the rotation of the engine 1. Here, the first planetary gear mechanism 10 that is a differential mechanism is illustrated as an example of the power transmission mechanism. The first planetary gear mechanism 10 is an input-side differential mechanism arranged on the engine 1 side to the second planetary gear mechanism 20. The first planetary gear mechanism 10 is able to change the rotation of the engine 1 in speed and output the rotation. The first planetary gear mechanism 10 is of a single-pinion type, and includes a first sun gear 11, first pinion gears 12, a first ring gear 13 and the first carrier 14.

The first ring gear 13 is arranged coaxially with the first sun gear 11 on the radially outer side of the first sun gear 11. The first pinion gears 12 are arranged between the first sun gear 11 and the first ring gear 13, and each are in mesh with the first sun gear 11 and the first ring gear 13. The first pinion gears 12 are rotatably supported by the first carrier 14. The first carrier 14 is coupled to the input shaft 2, and integrally rotates with the input shaft 2. Thus, each of the first pinion gears 12 is revolvable around the central axis of the input shaft 2 together with the input shaft 2, and is supported by the first carrier 14 so as to be rotatable around the central axis of the first pinion gear 12.

The clutch CL1 is a clutch device that is able to couple the first sun gear 11 to the first carrier 14. The clutch CL1 may be, for example, a friction engagement clutch; however, the clutch CL1 is not limited to this configuration. A known clutch device, such as a dog clutch, may be used as the clutch CL1. The clutch CL1 is engaged or released under control of, for example, hydraulic pressure. The completely engaged clutch CL1 couples the first sun gear 11 to the first carrier 14, and allows the first sun gear 11 and the first carrier 14 to integrally rotate. The completely engaged clutch CL1 restricts differential motion of the first planetary gear mechanism 10. On the other hand, the released clutch CL1 separates the first sun gear 11 from the first carrier 14, and allows relative rotation between the first sun gear 11 and the first carrier 14. That is, the released clutch CL1 allows differential motion of the first planetary gear mechanism 10. The clutch CL1 is controllable to a half-engaged state (slip-engaged state).

The brake BK1 is a brake device that is able to restrict rotation of the first sun gear 11. The brake BK1 includes an engagement element connected to the first sun gear 11 and an engagement element connected to a vehicle body side, for example, the case of the power transmission device. The brake BK1 may be a similar friction engagement clutch device to the clutch CL1; however, the brake BK1 is not limited to this configuration. A known clutch device, such as a dog clutch, may be used as the brake BK1. The brake BK1 is engaged or released under control of, for example, hydraulic pressure. The completely engaged brake BK1 couples the first sun gear 11 to the vehicle body side, and is able to restrict rotation of the first sun gear 11. On the other hand, the released brake BK1 separates the first sum gear 11 from the vehicle body side, and allows rotation of the first sun gear 11. The brake BK1 is controllable to a half-engaged state (slip-engaged state).

The second planetary gear mechanism 20 according to the present embodiment corresponds to a differential mechanism that connects the first planetary gear mechanism 10 to the drive wheels 32. The second planetary gear mechanism 20 is an output-side differential mechanism arranged on the drive wheels 32 side to the first planetary gear mechanism 10. The second planetary gear mechanism 20 is of a single-pinion type, and includes a second sun gear 21, second pinion gears 22, a second ring gear 23 and a second carrier 24. The second planetary gear mechanism 20 is arranged coaxially with the first planetary gear mechanism 10, and is opposed to the engine 1.

The second ring gear 23 is arranged coaxially with the second sun gear 21 on the radially outer side of the second sun gear 21. The second pinion gears 22 are arranged between the second sun gear 21 and the second ring gear 23, and each are in mesh with the second sun gear 21 and the second ring gear 23. The second pinion gears 22 are rotatably supported by the second carrier 24. The second carrier 24 is connected to the first ring gear 13, and integrally rotates with the first ring gear 13. Each of the second pinion gears 22 is revolvable around the central axis of the input shaft 2 together with the second carrier 24, and is supported by the second carrier 24 so as to be rotatable around the central axis of the second pinion gear 22. The first ring gear 13 is an output element of the first planetary gear mechanism 10, and is able to output rotation, input from the engine 1 to the first planetary gear mechanism 10, to the second carrier 24. The second carrier 24 corresponds to a first rotating element connected to the output element of the first planetary gear mechanism 10.

A rotary shaft 33 of the first rotary machine MG1 is connected to the second sun gear 21. The rotary shaft 33 of the first rotary machine MG1 is arranged coaxially with the input shaft 2, and integrally rotates with the second sun gear 21. The second sun gear 21 corresponds to a second rotating element connected to the first rotary machine MG1. A counter drive gear 25 is connected to the second ring gear 23. The counter drive gear 25 is an output gear that integrally rotates with the second ring gear 23. The second ring gear 23 corresponds to a third rotating element connected to the second rotary machine MG2 and the drive wheels 32. The second ring gear 23 is, an output element that is able to output rotation, input from the first rotary machine MG1 or the first planetary gear mechanism 10, to the drive wheels 32. Although not shown in FIG. 1, the counter drive gear 25 is supported on the case at both ends in the axial direction, and is configured to be able to reduce vibrations of the shaft as compared to unilateral support (see FIG. 10).

The counter drive gear 25 is in mesh with a counter driven gear 26. The counter driven gear 26 is connected to a drive pinion gear 28 via a counter shaft 27. The counter driven gear 26 and the drive pinion gear 28 integrally rotate. A reduction gear 35 is in mesh with the counter driven gear 26. The reduction gear 35 is connected to the rotary shaft 34 of the second rotary machine MG2. That is, rotation of the second rotary machine MG2 is transmitted to the counter driven gear 26 via the reduction gear 35. The reduction gear 35 has a smaller diameter than the counter driven gear 26, reduces rotation of the second rotary machine MG2 in speed, and transmits the rotation to the counter driven gear 26.

The drive pinion gear 28 is in mesh with a differential ring gear 29 of the differential device 30. The differential device 30 is connected to the drive wheels 32 via right and left drive shafts 31. The second ring gear 23 is connected to the drive wheels 32 via the counter drive gear 25, the counter driven gear 26, the drive pinion gear 28, the differential device 30 and the drive shafts 31. The second rotary machine MG2 is connected to a power transmission path between the second ring gear 23 and the drive wheels 32, and is able to transmit power to each of the second ring gear 23 and the drive wheels 32.

Each of the first rotary machine MG1 and the second rotary machine MG2 has the function of a motor (electric motor) and the function of a generator. The first rotary machine MG1 and the second rotary machine MG2 are connected to a battery via corresponding inverters. Each of the first rotary machine MG1 and the second rotary machine MG2 is able to convert electric power, supplied from the battery, to mechanical power and output the mechanical power, and is able to be driven by input mechanical power and convert the mechanical power to electric power. Electric power generated by the rotary machines MG1, MG2 is storable in the battery. For example, an alternating-current synchronous motor generator may be used as each of the first rotary machine MG1 and the second rotary machine MG2.

As shown in FIG. 2, the vehicle 100 includes the HV_ECU 50, the MG_ECU 60 and the engine_ECU 70. Each of the ECUs 50, 60, 70 is an electronic control unit having a computer. The HV_ECU 50 has the function of executing integrated control over the vehicle 100 as a whole. The MG_ECU 60 and the engine_ECU 70 are electrically connected to the HV_ECU 50.

The MG_ECU 60 is able to control the first rotary machine MG1 and the second rotary machine MG2. The MG_ECU 60 is, for example, able to control the output torque of the first rotary machine MG1 by adjusting a current value that is supplied to the first rotary machine MG1, and to control the output torque of the second rotary machine MG2 by adjusting a current value that is supplied to the second rotary machine MG2.

The engine_ECU 70 is able to control the engine 1. The engine_ECU 70 is, for example, able to control the opening degree of an electronic throttle valve of the engine 1, execute ignition control over the engine 1 by outputting an ignition signal, and execute fuel injection control over the engine 1. The engine_ECU 70 is able to control the output torque of the engine 1 through opening degree control over the electronic throttle valve, injection control, ignition control, and the like.

A vehicle speed sensor, an accelerator operation amount sensor, an MG1 rotation speed sensor, an MG2 rotation speed sensor, an output shaft rotation speed sensor, a battery (SOC) sensor, and the like, are connected to the HV_ECU 50. With these sensors, the HV_ECU 50 is able to acquire a vehicle speed, an accelerator operation amount, the rotation speed of the first rotary machine MG1, the rotation speed of the second rotary machine MG2, the rotation speed of the output shaft of the power transmission device, a battery state SOC, and the like.

The HV_ECU 50 is able to calculate a required driving force, a required power, a required torque, and the like, for the vehicle 100 on the basis of the acquired information. The HV_ECU 50 determines the output torque of the first rotary machine MG1 (hereinafter, referred to as "MG1 torque"), the output torque of the second rotary machine MG2 (hereinafter, referred to as "MG2 torque") and the output torque of the engine 1 (hereinafter, referred to as "engine torque") on the basis of the calculated required values. The HV_ECU 50 outputs a command value of the MG1 torque and a command value of the MG2 torque to the MG_ECU 60. The HV_ECU 50 outputs a command value of the engine torque to the engine_ECU 70.

The HV_ECU 50 controls the clutch CL1 and the brake BK1 on the basis of a drive mode (described later), and the like. The HV_ECU 50 outputs a command value (PbCL1) of hydraulic pressure supplied to the clutch CL1 and a command value (PbBK1) of hydraulic pressure supplied to the brake BK1. A hydraulic control device (not shown) controls the hydraulic pressure supplied to the clutch CL1 in response to the command value PbCL1 and the hydraulic pressure supplied to the brake BK1 in response to the command value PbBK1.

In the vehicle 100 according to the present embodiment, as shown in FIG. 1, the first rotary machine MG1 is arranged coaxially with the output shaft of the engine 1 (input shaft 2). The second rotary machine MG2 is arranged on the rotary shaft 34 different from the output shaft of the engine 1. That is, the hybrid vehicle drive system 1-1 according to the present embodiment is of a multi-shaft type in which the input shaft 2 and the rotary shaft 34 of the second rotary machine MG2 are arranged on different shafts.

In the hybrid vehicle drive system 1-1 according to the present embodiment, the second planetary gear mechanism 20 is arranged between the engine 1 and the first rotary machine MG1. The first rotary machine MG1 and the second planetary gear mechanism 20 are arranged between the engine 1 and the first planetary gear mechanism 10, brake BK1 and clutch CL1. The first planetary gear mechanism 10 serves as the transmission unit. That is, in the hybrid vehicle drive system 1-1 according to the present embodiment, the second planetary gear mechanism 20, the first rotary machine MG1 and the transmission unit (the first planetary gear mechanism 10, the brake BK1 and the clutch CL1) are arranged along the same axis as the output shaft of the engine 1 in order from the side close to the engine 1.

The expression "an element a is arranged between an element b and an element c" means a state where the element a is present between the element b and the element c at a position along the axial direction of the output shaft of the engine 1 (input shaft 2). When the first rotary machine MG1 is used in this expression, the meaning of the first rotary machine MG1 is limited to the range of a rotor and a stator, and does not include the rotary shaft 33.

The input shaft 2 passes through the inside of the rotary shaft 33 of the first rotary machine MG1, and extends further to the side across the brake BK1 and the clutch CL1 from the engine 1. The input shaft 2 is connected to a mechanical oil pump 3. The mechanical oil pump 3 is arranged coaxially with the engine 1, the first planetary gear mechanism 10, the second planetary gear mechanism 20 and the first rotary machine MG1, and is opposed to the engine 1 across the first planetary gear mechanism 10, the second planetary gear mechanism 20 and the first rotary machine MG1. The mechanical oil pump 3 is connected to the output shaft of the engine 1 via the input shaft 2, and is driven by the driving force of the engine 1.

The mechanical oil pump 3 is configured to be driven by the engine 1 as a drive source so as to supply working oil to the shift device formed of the clutch CL1 and the brake BK1 and supply lubricating oil to the first planetary gear mechanism 10 and the second planetary gear mechanism 20.

Next, the operation of the hybrid vehicle drive system 1-1 according to the present embodiment will be described with reference to FIG. 3 to FIG. 8.

Figure 3:
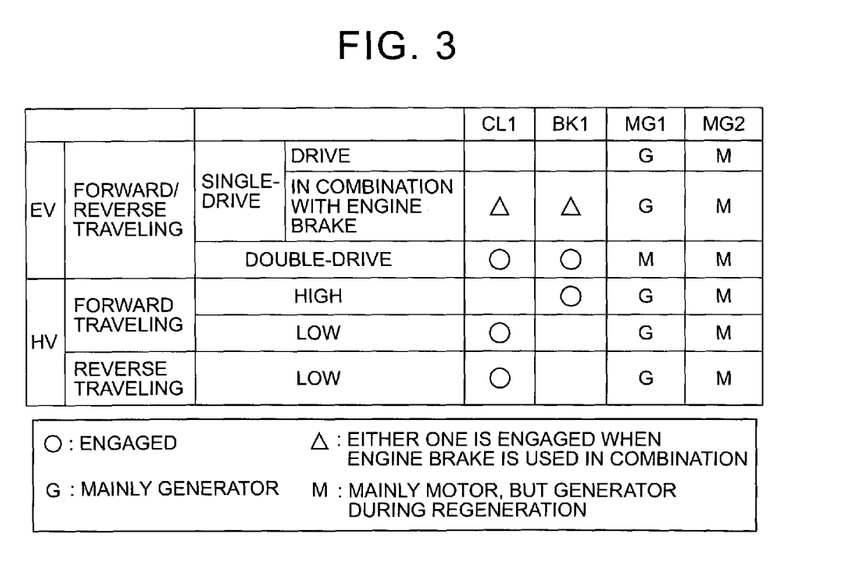
FIG. 3 is a view that shows an engagement operation table of the hybrid vehicle drive system according to the first embodiment.

FIG. 3 is a view that shows an engagement operation table of the hybrid vehicle drive system 1-1 according to the present embodiment. The vehicle 100 is able to selectively travel in a hybrid (HV) drive mode or an EV drive mode. In the HV drive mode, the vehicle 100 is caused to travel with the use of both the engine 1 and the second rotary machine MG2 or only the engine 1 as a power source.

In the EV drive mode, the vehicle 100 is caused to travel with the use of at least one of the first rotary machine MG1 and the second rotary machine MG2 as a power source. In the EV drive mode, the vehicle 100 is able to travel while the engine 1 is stopped. The hybrid vehicle drive system 1-1 according to the present embodiment includes a single-motor EV mode (single-drive EV mode) and a double-motor EV mode (double-drive EV mode) as the EV drive mode. In the single-motor EV mode, the vehicle 100 is caused to travel with the use of the second rotary machine MG2 as a single power source. In the double-motor EV mode, the vehicle 100 is caused to travel with the use of both the first rotary machine MG1 and the second rotary machine MG2 as a power source.

Figure 4:
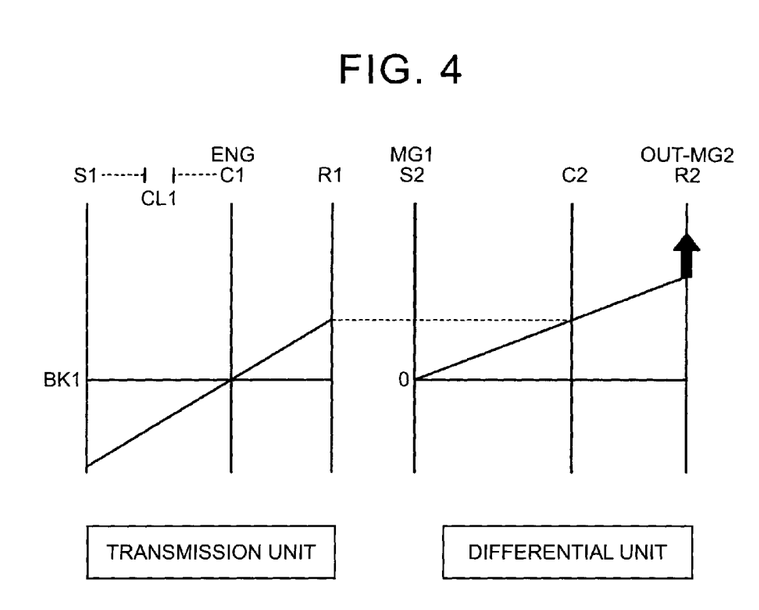
FIG. 4 is a nomograph regarding a single-motor EV mode.

In the engagement table of FIG. 3, the circles in the fields of the clutch CL1 and in the fields of the brake BK1 indicate an engaged state, and the blank fields indicate a released state. The triangles indicate that any one of the clutch CL1 and the brake BK1 is engaged and the other one is released. The single-motor EV mode is, for example, executed while both the clutch CL1 and the brake BK1 are released. FIG. 4 is a nomograph regarding the single-motor EV mode. In the nomograph, reference signs S1, C1, R1 respectively denote the first sun gear 11, the first carrier 14 and the first ring gear 13, that is, the first planetary gear mechanism 10 of the transmission unit, and reference signs S2, C2, R2 respectively indicate the second sun gear 21, the second carrier 24 and the second ring gear 23, that is, the second planetary gear mechanism 20 of the differential unit.

In the single-motor EV mode, the clutch CL1 and the brake BK1 are released. The first sun gear 11 is allowed to rotate because the brake BK1 is released, and the first planetary gear mechanism 10 is allowed to carry out differential motion because the clutch CL1 is released. The HV_ECU 50 causes the vehicle 100 to generate driving force in the forward traveling direction by causing the second rotary machine MG2 to output positive torque via the MG_ECU 60. The second ring gear 23 rotates in the positive direction in interlocking with rotation of the drive wheels 32. Here, the rotation in the positive direction is regarded as the rotation in the direction of the second ring gear 23 when the vehicle 100 travels forward. The HV_ECU 50 reduces a drag loss by causing the first rotary machine MG1 to operate as a generator. Specifically, the HV_ECU 50 causes the first rotary machine MG1 to generate electric power by applying a slight torque to the first rotary machine MG1, and then brings the rotation speed of the first rotary machine MG1 to zero. Thus, it is possible to reduce a drag loss of the first rotary machine MG1. When it is possible to keep the MG1 rotation speed at zero by utilizing cogging torque even when the MG1 torque is set to zero, the MG1 torque does not need to) be applied. Alternatively, the MG1 rotation speed may be brought to zero through d-axis dock of the first rotary machine MG1.

The first ring gear 13 rotates in the positive direction in interlocking with the second carrier 24. Because the first planetary gear mechanism 10 is in a neutral state where the clutch CL1 and the brake BK1 are released, the engine 1 is not interlocked, and the first carrier 14 stops its rotation. Thus, it is possible to gain a large amount of regeneration. The first sun gear 11 races in the negative direction. In the neutral state of the first planetary gear mechanism 10, power is not transmitted between the first ring gear 13 and the first carrier 14, that is, the engine 1 and the second planetary gear mechanism 20 are separated from each other and transmission of power is interrupted. The first planetary gear mechanism 10 is in a connected state where the engine 1 is connected to the second planetary gear mechanism 20 when at least any one of the clutch CL1 and the brake BK1 is engaged.

While the vehicle 100 is traveling in the single-motor EV mode, there can be a case where the state of charge of the battery becomes full and regenerative energy is not gained. In this case, it is conceivable that engine brake is used in combination. By engaging the clutch CL1 or the brake BK1, it is possible to connect the engine 1 to the drive wheels 32, and to apply engine brake to the drive wheels 32. As indicated by the triangles in FIG. 3, when the clutch CL1 or the brake BK1 is engaged in the single-motor EV mode, it is possible to set the engine 1 in an interlocked state, and to enter an engine brake state by raising the engine rotation speed with the use of the first rotary machine MG1.

Figure 5:
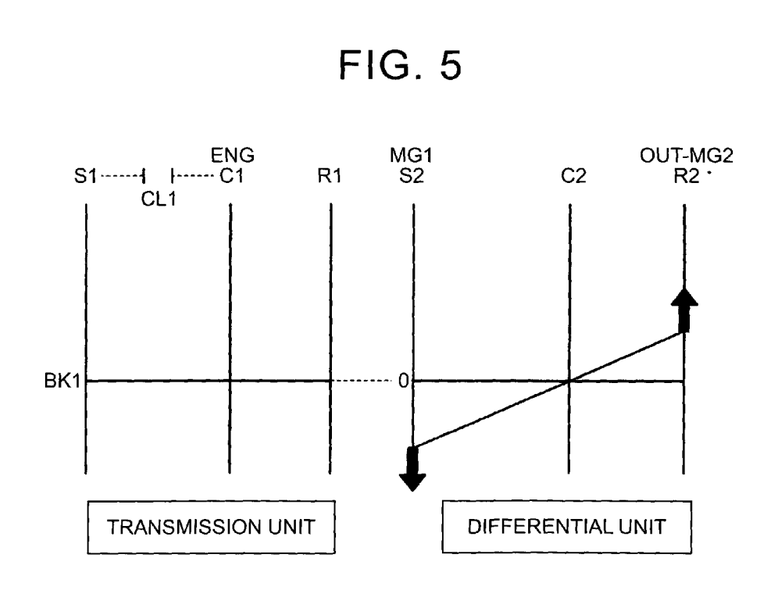
FIG. 5 is a nomograph regarding double-motor EV mode.

In the double-motor EV mode, the HV_ECU 50 engages the clutch CL1 and the brake BK1. FIG. 5 is a nomograph regarding the double-motor EV mode. Differential motion of the first planetary gear mechanism 10 is restricted because the clutch CL1 is engaged, and rotation of the first sun gear 11 is restricted because the brake BK1 is engaged. Thus, rotation of all the rotating elements of the first planetary gear mechanism 10 stops. Because rotation of the first ring gear 13 that is the output element is restricted, the second carrier 24 connected to the first ring gear 13 is locked to zero rotation.

The HV_ECU 50 causes each of the first rotary machine MG1 and the second rotary machine MG2 to output torque for propelling the vehicle 100. Because rotation of the second carrier 24 is restricted, the second carrier 24 is able to gain reaction force against the torque of the first rotary machine MG1, and to cause the torque of the first rotary machine MG1 to output from the second ring gear 23. The first rotary machine MG1 is able to cause positive torque to output from the second ring gear 23 by outputting negative torque to rotate in the negative direction during forward traveling. On the other hand, during reverse traveling, the first rotary machine MG1 is able to cause negative torque to output from the second ring gear 23 by outputting positive torque to rotate in the positive direction.

Figure 6:
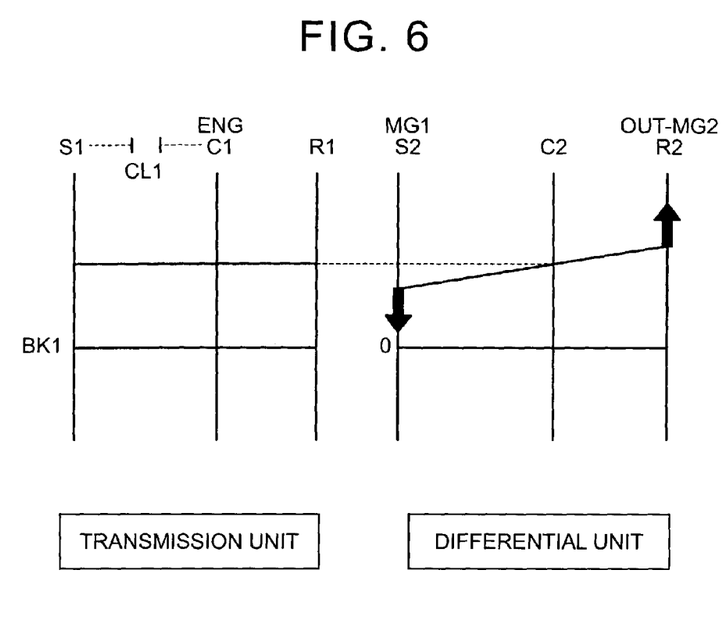
FIG. 6 is a nomograph regarding a low-state HV drive mode.
Figure 7:
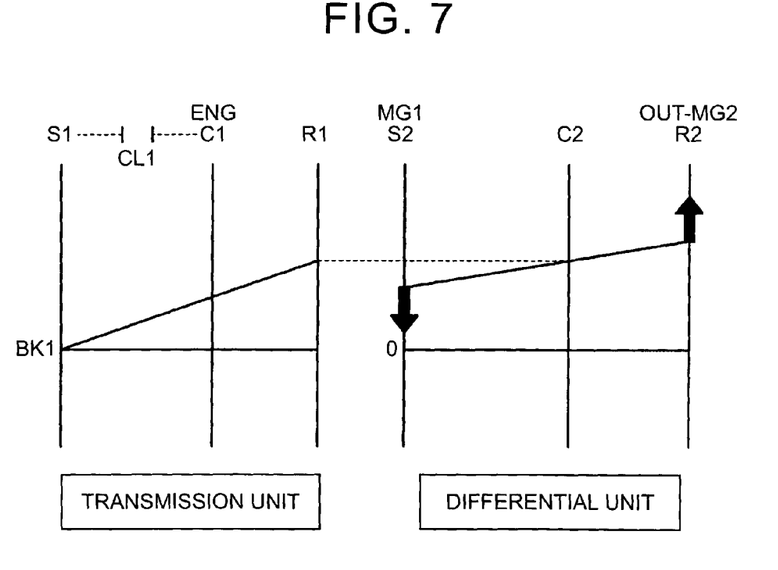
FIG. 7 is a nomograph regarding a high-state HV drive mode.

In the HV drive mode, the second planetary gear mechanism 20 that serves as the differential unit is basically in an operated state, and the first planetary gear mechanism 10 of the transmission unit is shifted between a low state and a high state. FIG. 6 is a nomograph regarding a low-state HV drive mode (hereinafter, also referred to as "HV low mode"). FIG. 7 is a nomograph regarding a high-state HV drive mode (hereinafter, also referred to as "HV high mode").

In the HV low mode, the HV_ECU 50 engages the clutch CL1, and releases the brake BK1. When the clutch CL1 is engaged, differential motion of the first planetary gear mechanism 10 is restricted, and the rotating elements 11, 13, 14 integrally rotate. Thus, rotation of the engine 1 is not increased or reduced in speed but is transmitted from the first ring gear 13 to the second carrier 24 at the same speed.

On the other hand, in the HV high mode, the HV_ECU 50 releases the clutch CL1, and engages the brake BK1. When the brake BK1 is engaged, rotation of the first sun gear 11 is restricted. Thus, the first planetary gear mechanism 10 enters an overdrive (OD) state where rotation of the engine 1, input to the first carrier 14, is increased in speed and is output from the first ring gear 13. In this way, the first planetary gear mechanism 10 is able to increase rotation of the engine 1 in speed and output the rotation. The speed ratio of the first planetary gear mechanism 10 in the overdrive state may be, for example, set to 0.7.

In this way, the shift device formed of the clutch CL1 and the brake BK1 shifts the first planetary gear mechanism 10 by changing between a state where differential motion of the first planetary gear mechanism 10 is restricted and a state where differential motion of the first planetary gear mechanism 10 is allowed. The hybrid vehicle drive system 1-1 is able to change between the HV high mode and the HV low mode with the use of the transmission unit including the first planetary gear mechanism 10, the clutch CL1 and the brake BK1, so it is possible to improve the transmission efficiency of the vehicle 100. The second planetary gear mechanism 20 that serves as the differential unit is connected in series with the transmission unit at a portion downstream of the transmission unit. Because the first planetary gear mechanism 10 is allowed to be changed into the overdrive state, it is advantageous that the first rotary machine MG1 does not need to be able to output a significantly high torque.

Figure 8:
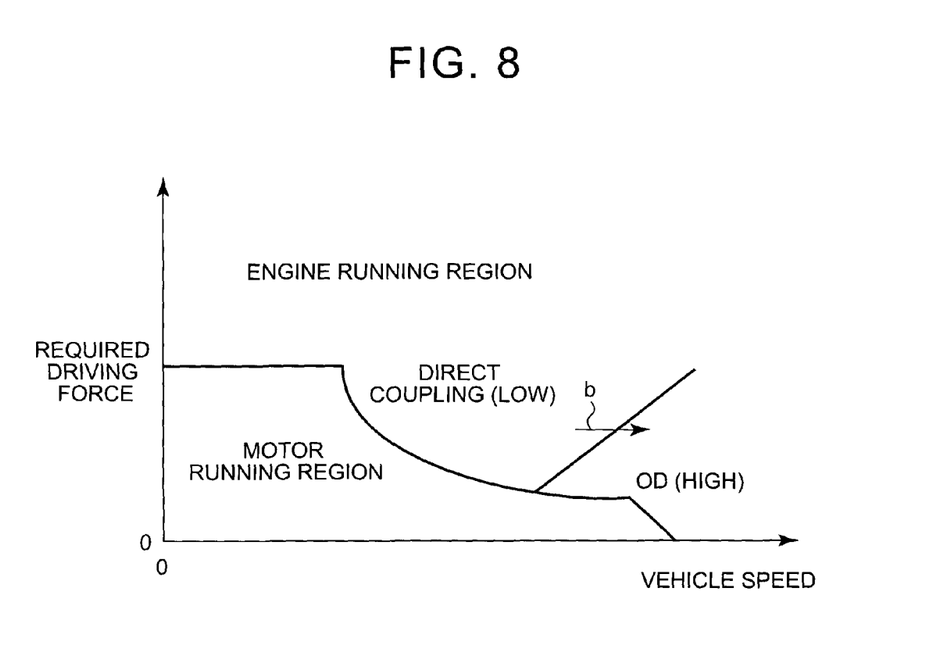
FIG. 8 is a graph that shows a map regarding a mode selection according to the first embodiment.

The HV_ECU 50, for example, selects the HV high mode at a high vehicle speed, and selects the HV low mode at an intermediate or low vehicle speed. Here, selection of a speed position (mode) by the HV_ECU 50 will be described with reference to FIG. 8. FIG. 8 is a view that shows a map regarding a mode selection according to the present embodiment. In FIG. 8, the abscissa axis represents vehicle speed, and the ordinate axis represents required driving force. The required driving force is estimated on the basis of, for example, the accelerator operation amount.

In the present embodiment, the HV_CU 50, for example, carries out a mode selection by consulting the map shown in FIG. 8. As shown in the map of FIG. 8, a low load region in which the vehicle speed is low and the required driving force is small is a motor running region. In the motor running region, for example, the single-motor EV mode is selected at a low load, and the double-motor EV mode is selected at a high load. During single-motor running, the transmission unit is set to a neutral state by releasing the clutch CL1 and the brake BK1, thus setting the engine rotation speed to zero and reducing a drag of the first rotary machine MG1.

A region that is higher in vehicle speed or higher in load than the motor running region is an engine running region. The engine running region is further divided into a direct-coupling (low) region and an OD (high) region. The direct-coupling region is the engine running region in which the HV low mode is selected. The OD region is the engine running region in which the HV high mode is selected. The OD region is a high vehicle speed region, and the direct-coupling region is an intermediate or low vehicle speed region. The direct-coupling region is set to a higher load side than the OD region. By setting the transmission unit to the overdrive state at a high vehicle speed and low load, it is possible to improve fuel economy.

In accordance with the map shown in FIG. 8, when the required driving force increases, the HV_ECU 50 changes the drive mode of the vehicle 100 from the EV drive mode to the HV drive mode. Which one of the HV low mode and the HV high mode the drive mode is changed to within the HV drive mode depends on the vehicle speed. In the case of an intermediate or low vehicle speed, the drive mode shifts into the direct-coupling region, and the HV low mode is selected. On the other hand, in the case of a high vehicle speed, the drive mode shifts into the OD region, and the HV high mode is selected. As indicated by the arrow b in FIG. 8, when the vehicle speed shifts from the intermediate or low vehicle speed to the high vehicle speed, the HV_ECU 50 changes the drive mode of the vehicle 100 from the HV low mode to the HV high mode.

Next, the advantageous effects of the hybrid vehicle drive system 1-1 according to the present embodiment will be described.

The hybrid vehicle drive system 1-1 according to the present embodiment includes the engine 1, the first rotary machine MG1, the second planetary gear mechanism 20, and the transmission unit (the first planetary gear mechanism 10, the clutch CL1, and the brake BK1). The second planetary gear mechanism 20 serves as the differential unit that connects the engine 1 and the first rotary machine MG1 to the drive wheels 32 side. The transmission unit changes rotation of the engine 1 in speed and transmits the rotation to the second planetary gear mechanism 20. The engine 1, the first rotary machine MG1, the second planetary gear mechanism 20 and the transmission unit are arranged coaxially with one another, and the second planetary gear mechanism 20 is arranged between the engine 1 and the first rotary machine MG1. The first rotary machine MG1 and the second planetary gear mechanism 20 are arranged between the transmission unit and the engine 1.

With this configuration, the first rotary machine MG1 and the second planetary gear mechanism 20 are arranged between the engine 1 and the transmission unit (the first planetary gear mechanism 10, the clutch CL1 and the brake BK1) that shifts rotation of the engine 1 in speed and transmits the rotation to the drive wheels 32 side. Therefore, the arrangement configuration of the first rotary machine MG1, the second planetary gear mechanism 20 and the engine 1, which are the elements of the drive system, are substantially the same as the configuration that includes no transmission unit. Therefore, even when the drive system including the transmission mechanism (transmission unit) and mainly applied to an FR vehicle is applied to an FF vehicle or an RR vehicle, it is possible to reduce the change of the configuration of the drive system, and it is possible to provide commonality of components between the drive system and the existing drive system of an FF vehicle or an RR vehicle. Specifically, the second ring gear 23 of the second planetary gear mechanism 20 that serves as the differential unit, a bearing 36 (see FIG. 10) that supports the second ring gear 23 on the case, and the elements on the drive wheels 32 side to the second ring gear 23 are not changed from the arrangement configuration of an ordinary FF vehicle or RR vehicle. Therefore, it is possible to provide commonality of components between the hybrid vehicle drive system including the transmission unit and a hybrid vehicle drive system including no transmission unit. The commonality of the components is provided, so it is possible to share manufacturing equipment. Thus, it is possible to suppress an increase in cost even when the transmission mechanism is included.

Figure 9:
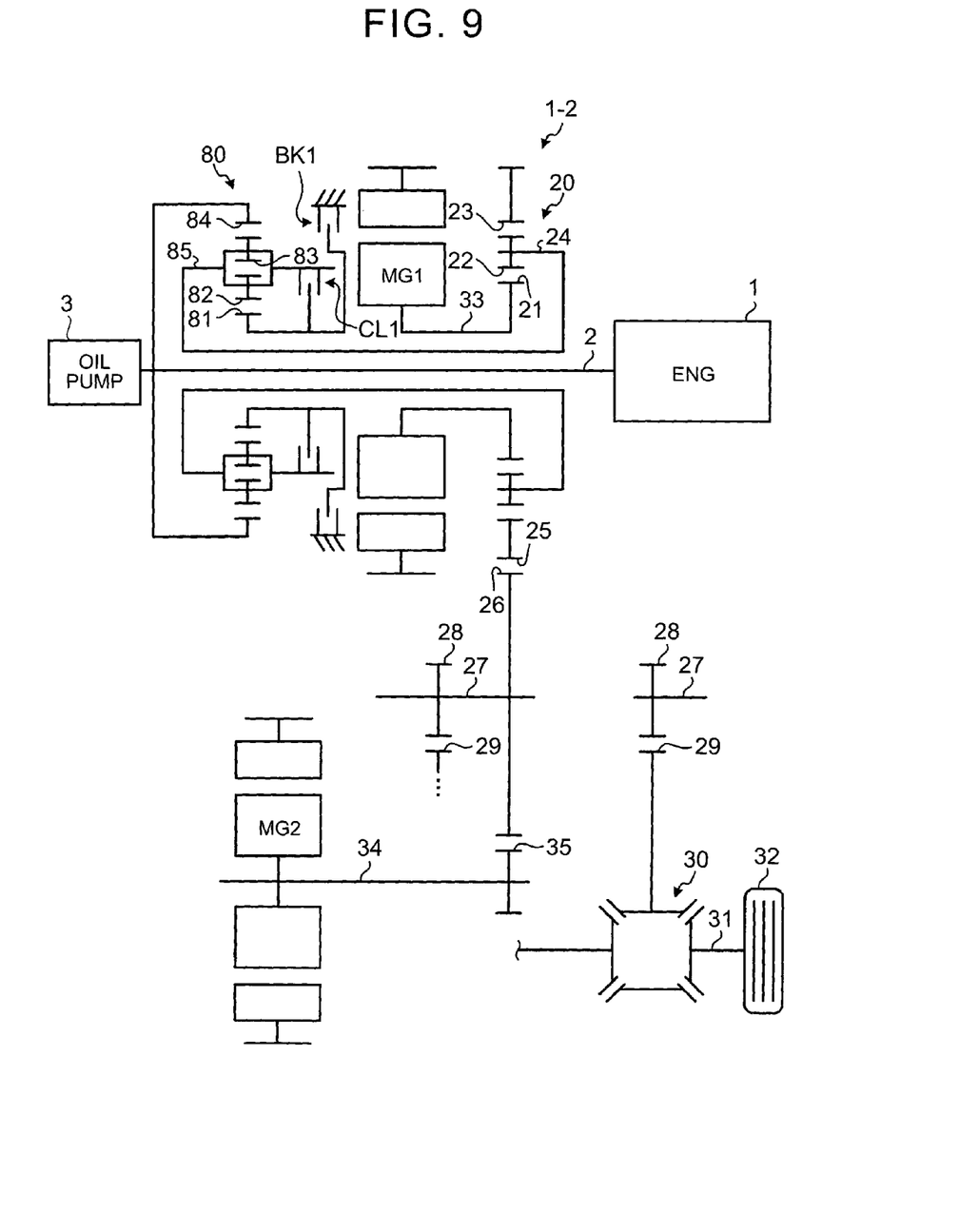
FIG. 9 is a skeletal view of a hybrid vehicle drive system according to a second embodiment of the invention.
Figure 10:
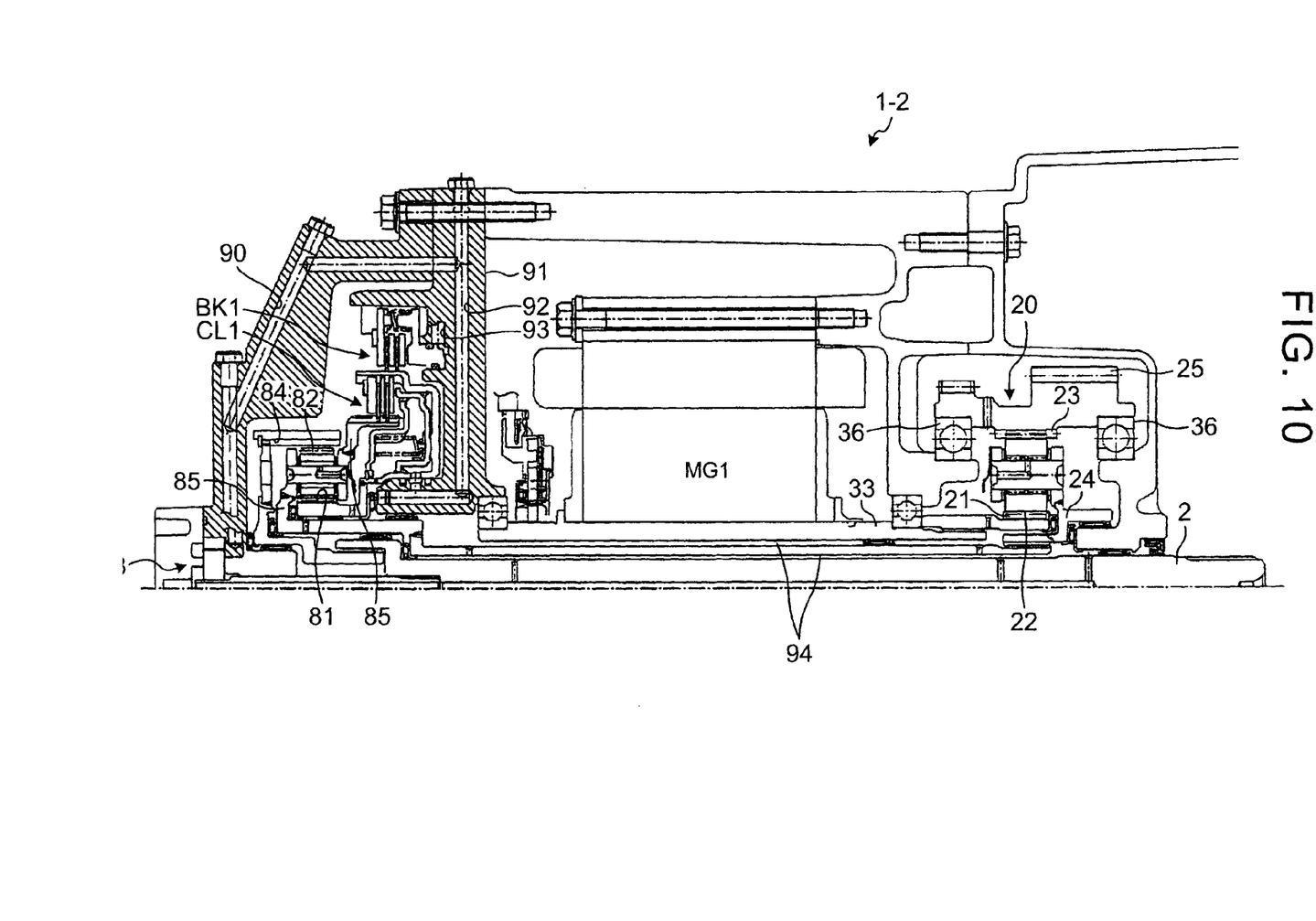
FIG. 10 is a longitudinal cross-sectional view of components arranged coaxially with an engine in the hybrid vehicle drive system shown in FIG. 9.

Next, a second embodiment will be described with reference to FIG. 9 and FIG. 10. FIG. 9 is a skeletal view of a hybrid vehicle drive system according to the second embodiment of the invention. FIG. 10 is a longitudinal cross-sectional view of components arranged coaxially with an engine in the hybrid vehicle drive system shown in FIG. 9.

As shown in FIG. 9 and FIG. 10, the hybrid vehicle drive system 1-2 according to the second embodiment differs from the hybrid vehicle drive system 1-1 according to the first embodiment in that a first planetary gear mechanism 80 of the transmission unit is of a double-pinion type (double planetary) and the clutch CL1 and the brake BK1 that serve as the shift device of the transmission unit are arranged between the first planetary gear mechanism 80 and the first rotary machine MG1.

The first planetary gear mechanism 80 is of a double pinion type, and includes a sun gear 81, inner pinion gears 82, outer pinion gears 83, a ring gear 84 and a carrier 85. The ring gear 84 is arranged coaxially with the sun gear 81 on the radially outer side of the sun gear 81. The inner pinion gears 82 and the outer pinion gears 83 are arranged between the sun gear 81 and the ring gear 84. The inner pinion gears 82 are arranged on the radially inner side of the outer pinion gears 83. Each of the inner pinion gears 82 is in mesh with the sun gear 81 and a corresponding one of the outer pinion gears 83. Each of the outer pinion gears 83 is in mesh with a corresponding one of the inner pinion gears 82 and the ring gear 84. The inner pinion gears 82 and the outer pinion gears 83 are rotatably supported by the carrier 85. Although the outer pinion gears 83 are not shown in FIG. 10, actually, the outer pinion gears 83 are arranged in the circumferential direction of the cross section (normal direction in the drawing) shown in FIG. 10, and each inner pinion gear 82 and the ring gear 84 are in mesh with a corresponding one of the outer pinion gears 83.

The ring gear 84 is coupled to the input shaft 2, and integrally rotates with the input shaft 2. That is, the ring gear 84 is an input element of the first planetary gear mechanism 80. The ring gear 84 is coupled to the input shaft 2 at a position across the first planetary gear mechanism 80 from the engine 1. The clutch CL1 is a clutch device that is able to couple the sun gear 81 to the carrier 85. The brake BK1 is a brake device that is able to restrict rotation of the sun gear 81.

The carrier 85 is connected to the second carrier 24 of the second planetary gear mechanism 20, and integrally rotates with the second carrier 24. That is, the carrier 85 is an output element of the first planetary gear mechanism 80. The carrier 85 extends from the side across the first planetary gear mechanism 80 from the engine 1 to the engine 1 side of the second planetary gear mechanism 20 via a clearance between the rotary shaft 33 of the first rotary machine MG1 and the input shaft 2, and is coupled to the second carrier 24 of the second planetary gear mechanism 20.

The clutch CL1 and the brake BK1 are hydraulic engagement elements that are engaged or released under control of hydraulic pressure of working oil that is supplied by the mechanical oil pump 3. In the present embodiment, the clutch CL1 and the brake BK1 are arranged between the first planetary gear mechanism 80 and the first rotary machine MG1. Therefore, as shown in FIG. 10, working oil that is supplied from the mechanical oil pump 3 passes through an oil supply passage 90 and is supplied to oil supply passages 92, 93 in a support wall 91, and is then supplied from these oil supply passages 92, 93 to the clutch CL1 and the brake BK1. The oil supply passage 90 is provided inside the case of the power transmission device. The support wall 91 supports the first rotary machine MG1.

Lubricating oil that is supplied to the first planetary gear mechanism 80 and the second planetary gear mechanism 20 only needs a relatively low hydraulic pressure. For example, as shown in FIG. 10, lubricating oil is supplied from the mechanical oil pump 3 to the first planetary gear mechanism 80 and the second planetary gear mechanism 20 through a lubricating oil passage 94 formed in the clearance between the input shaft 2 and the rotary shaft 33 of the first rotary machine MG1.

On the other hand, working oil that is supplied to the shift device requires a relatively high hydraulic pressure in order to engage or release each of the clutch CL1 and the brake BK1. Therefore, oil discharged from the mechanical oil pump 3 is, for example, controlled to a high pressure via a hydraulic control circuit (not shown), and is then supplied to the shift device through the oil supply passages 90, 92, 93 as shown in FIG. 10. If the shift device is arranged on the engine 1 side to the first rotary machine MG1 at a distance from the mechanical oil pump 3, an oil supply passage longer than the oil supply passages 90, 92, 93 shown in FIG. 10 is required in order to supply high-pressure working oil to the shift device. Alternatively, it can be required to arrange an oil pump different from the mechanical oil pump 3 in proximity to the shift device and additionally provide a drive shaft, or the like, that transmits engine power to this oil pump.

In contrast, in the second embodiment, because the shift device is arranged in proximity to the mechanical oil pump 3, it is easy to supply working oil to the shift device, and it is possible to supply lubricating oil to the first planetary gear mechanism 80 and the second planetary gear mechanism 20 and supply working oil to the clutch CL1 and the brake BK1 with the use of the single mechanical oil pump 3. Therefore, it is possible to suitably supply oil with a simple configuration. In the first embodiment as well, because the transmission unit is arranged in proximity to the mechanical oil pump 3 as show in FIG. 1, it is possible to suitably supply oil with a simple configuration as in the case of the second embodiment.

In the present embodiment, as shown in FIG. 9 and FIG. 10, the axial size of the hybrid vehicle drive system 1-2 is reduced by arranging the brake BK1 on the outer peripheral side of the clutch CL1 in the shift device.

In the hybrid vehicle drive system 1-2 according to the second embodiment in this way, the transmission unit includes the first planetary gear mechanism 80 that transmits rotation of the engine 1 to the differential unit (second planetary gear mechanism 20) and the shift device (the clutch CL1 and the brake BK1) that shifts the speed ratio of the first planetary gear mechanism 80. The first planetary gear mechanism 80 is formed of a double-pinion type. The shift device is arranged between the first planetary gear mechanism 80 and the first rotary machine MG1.

The shift device of the transmission unit includes the clutch CL1 and the brake BK1 that are hydraulic engagement elements, and is able to shift the speed ratio of the first planetary gear mechanism 80 by engaging or releasing each of the clutch CL1 and the brake BK1. The hybrid vehicle drive system 1-2 includes the oil supply passages 92, 93 that are provided inside the support wall 91, extending between the first rotary machine MG1 and the shift device and supporting the first rotary machine MG1. The oil supply passages 92, 93 are used to supply working oil of the clutch CL1 and the brake BK1 that are the engagement elements of the shift device.

With these configurations, by forming the first planetary gear mechanism 80 of the transmission unit of a double-pinion type, the shift device (the clutch CL1 and the brake BK1) of the transmission unit is allowed to be arranged next to the first rotary machine MG1. Therefore, the oil supply passages 92, 93 for supplying working oil of the shift device may be provided inside the support wall 91 that is also present in the existing drive system. Therefore, even when there are spatial restrictions due to side members, or the like, such as when the drive system is applied to an FF vehicle or an RR vehicle, it is possible to reduce the axial size, so it is advantageous in mountability.

The embodiments of the invention are described above; however, the above-described embodiments are only illustrative and are not intended to limit the scope of the invention. The above-described embodiments may be implemented in other various forms, and may be variously omitted, replaced or modified without departing from the summary of the invention. The above-described embodiments and their modifications are included in the scope of the invention recited in the appended claims and equivalents thereof as well as included in the scope or summary of the invention.

In the above-described embodiments, as shown in FIG. 1, FIG. 9, and FIG. 10, the brake BK1 and the clutch CL1 that serve as the shift device of the transmission unit are arranged in order of the brake BK1 and the clutch CL1 from the engine 1 side. Instead, the first rotary machine MG1 and the second planetary gear mechanism 20 just need to be arranged between the shift device and the engine 1, and the positions of the brake BK1 and the clutch CL1 may be interchanged.

In the above-described embodiments, as shown in FIG. 1, FIG. 9, and FIG. 10, the brake BK1 is arranged on the outer peripheral side of the clutch CL1 in the shift device. Instead, for example, the radial length of the shift device may be further reduced by arranging the clutch CL1 and the brake BK1 side by side in the axial direction.

The invention claimed is:

1. A drive system for a hybrid vehicle, the drive system comprising:
   an engine;
   a rotary machine arranged coaxially with the engine;
   a differential unit connecting the engine and the rotary machine to a drive wheel side, the differential unit being arranged coaxially with the engine and the rotary machine, the differential unit being arranged between the engine and the rotary machine;
   a transmission unit changing rotation of the engine in speed and transmitting the rotation to the differential unit, the transmission unit being arranged coaxially with the engine, the rotary machine and the differential unit, and
   the rotary machine and the differential unit being arranged between the transmission unit and the engine,
   wherein the transmission unit includes a planetary gear unit which is configured to transmit rotation of the engine to the differential unit and a shift device which is configured to shift a speed ratio of the planetary gear unit, the planetary gear unit is of a double pinion type, and the shift device is arranged between the planetary gear unit and the rotary machine.

2. The drive system according to claim 1, further comprising:
   an oil supply passage arranged inside a support wall that supports the rotary machine, the support wall extending between the rotary machine and the shift device, wherein
   the shift device includes a hydraulic engagement element, the shift device is configured to shift the speed ratio by engaging or releasing the engagement element, the oil supply passage is configured to supply working oil to the engagement element of the shift device.

* * * * *